US012018567B2

(12) United States Patent
Savard et al.

(10) Patent No.: US 12,018,567 B2
(45) Date of Patent: Jun. 25, 2024

(54) JOINT BETWEEN GAS TURBINE ENGINE COMPONENTS WITH BONDED FASTENER(S)

(71) Applicant: Pratt & Whitney Canada Corp., Longueuil (CA)

(72) Inventors: Philippe Savard, Terrebonne (CA); Guy Lefebvre, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/828,670

(22) Filed: May 31, 2022

(65) Prior Publication Data

US 2023/0383667 A1 Nov. 30, 2023

(51) Int. Cl.
*F01D 11/00* (2006.01)

(52) U.S. Cl.
CPC .......... *F01D 11/003* (2013.01); *F01D 11/005* (2013.01); *F05D 2240/55* (2013.01); *F05D 2260/30* (2013.01)

(58) Field of Classification Search
CPC .. F01D 11/005; F01D 11/003; F05D 2260/30; F05D 2240/55
See application file for complete search history.

(56) References Cited

U.S. PATENT DOCUMENTS 3,801,220 A * 4/1974 Beckershoff .......... F01D 11/006 416/198 A
5,232,339 A * 8/1993 Plemmons .............. F01D 5/084 416/198 A
7,549,845 B2 6/2009 Uwami
7,736,122 B1 * 6/2010 Stone .................. F16J 15/0887 415/200
8,382,432 B2 * 2/2013 Grissino ............... F01D 11/001 415/199.5
9,334,738 B2 * 5/2016 Nereim ..................... F01D 5/06
10,215,043 B2 2/2019 Treat
11,692,449 B2 * 7/2023 Stoyanov .............. F01D 25/183 277/404

(Continued)

FOREIGN PATENT DOCUMENTS

WO WO-2020076301 A1 * 4/2020
WO 2021216090 A1 10/2021

OTHER PUBLICATIONS

EP Search Report for EP Patent Application No. 23176432.5 dated Oct. 31, 2023.

*Primary Examiner* — Eric J Zamora Alvarez
*Assistant Examiner* — Theodore C Ribadeneyra
(74) *Attorney, Agent, or Firm* — Getz Balich LLC

(57) ABSTRACT

An assembly is provided for a gas turbine engine. This gas turbine engine assembly includes a seal carrier, a seal land, a seal ring, a plate and a fastener. The seal carrier has an annular groove and extends between a first side and a second side. The seal land is opposite the annular groove. The seal ring seals a gap between the seal carrier and the seal land. The seal ring is seated in the annular groove. The plate is at the second side of the seal carrier. The fastener includes a head and an elongated member connected to the head. The head is at the first side of the seal carrier. The elongated member projects out from the head through the seal carrier, the seal ring and the plate. The elongated member is bonded to the plate.

16 Claims, 8 Drawing Sheets

(56) References Cited

U.S. PATENT DOCUMENTS

2004/0120807 A1* 6/2004 Albers .................. F01D 11/003 415/170.1
2006/0123797 A1* 6/2006 Zborovsky ............ F16J 15/062 60/800
2010/0196164 A1* 8/2010 Liotta ................... F01D 5/3015 416/220 R
2012/0043724 A1* 2/2012 Scimeca ............... F01D 11/122 277/306
2013/0167685 A1* 7/2013 Ferryman ............... F16J 15/16 74/608
2014/0241863 A1* 8/2014 Tardif ....................... F02K 1/80 415/145
2014/0271038 A1* 9/2014 Muskat ..................... F02C 7/28 228/139
2015/0056068 A1* 2/2015 Wiebe ....................... F02C 7/28 415/173.1
2015/0315925 A1* 11/2015 Budnick ............... F01D 11/003 415/214.1
2016/0003081 A1* 1/2016 Broomer ................... F01D 9/02 415/173.1
2016/0025221 A1* 1/2016 Penz ...................... F16J 15/022 277/637
2016/0102578 A1* 4/2016 Leszczynski ......... F01D 25/243 277/575
2016/0123373 A1* 5/2016 Gambardella ........ F01D 11/005 411/108
2016/0160667 A1* 6/2016 Brown .................... F01D 9/023 60/722
2016/0265376 A1* 9/2016 Tsutsumi .............. F01D 11/003
2016/0273374 A1* 9/2016 Mitchell .................. F16J 15/32
2016/0348581 A1* 12/2016 Wiedemer ............... F01D 25/24
2017/0114653 A1* 4/2017 Ugarte ....................... F01D 9/04
2017/0191371 A1* 7/2017 Dungs ................... F01D 5/3015
2017/0241281 A1* 8/2017 Treat ..................... F01D 25/246
2018/0003067 A1* 1/2018 Bidkar ...................... F01D 5/02
2018/0045317 A1* 2/2018 Kono ....................... F16J 15/22
2018/0135449 A1* 5/2018 Klingels ................... F02C 7/28
2018/0291757 A1* 10/2018 Kennedy ............... F01D 17/165
2018/0298767 A1* 10/2018 Correia ................... F01D 9/041
2018/0347385 A1 12/2018 Kishida
2019/0085711 A1* 3/2019 Gibson ................... F02K 3/072
2019/0136705 A1* 5/2019 Schlemmer ........... F01D 11/003
2019/0195136 A1* 6/2019 White ..................... F01D 9/023
2020/0025004 A1* 1/2020 Dunnigan ................. F02C 7/32
2020/0200034 A1* 6/2020 Filippi .................... F01D 25/24
2020/0224544 A1* 7/2020 Barker .................... F01D 11/08
2020/0256193 A1* 8/2020 Palomba ............... F01D 5/3015
2020/0355087 A1* 11/2020 Moreau ................. F01D 5/3038
2021/0023928 A1* 1/2021 Appleby ................... F02C 7/28
2021/0033028 A1* 2/2021 Oskam .................. F01D 11/005
2023/0042434 A1 2/2023 Taniguchi

* cited by examiner

JOINT BETWEEN GAS TURBINE ENGINE COMPONENTS WITH BONDED FASTENER(S)

TECHNICAL FIELD

This disclosure relates generally to a gas turbine engine and, more particularly, to an anti-rotation joint between engine components.

BACKGROUND INFORMATION

A gas turbine engine may include a seal ring for sealing a gap between engine components. Various techniques are known in the art for retaining the seal ring in position relative to the engine components. While these known techniques have various benefits, there is still room in the art for improvement.

SUMMARY

According to an aspect of the present disclosure, an assembly is provided for a gas turbine engine. This gas turbine engine assembly includes a seal carrier, a seal land, a seal ring, a plate and a fastener. The seal carrier has an annular groove and extends between a first side and a second side. The seal land is opposite the annular groove. The seal ring seals a gap between the seal carrier and the seal land. The seal ring is seated in the annular groove. The plate is at the second side of the seal carrier. The fastener includes a head and an elongated member connected to the head. The head is at the first side of the seal carrier. The elongated member projects out from the head through the seal carrier, the seal ring and the plate. The elongated member is bonded to the plate.

According to another aspect of the present disclosure, another assembly is provided for a gas turbine engine. This gas turbine engine assembly includes an annular first engine component, an annular second engine component, a first retainer, a second retainer and an elongated member coupling the annular second engine component to the annular first engine component. The annular first engine component includes a first side member, a second side member and a groove extending within the annular first engine component between the first side member and the second side member. The annular second engine component is received within the groove. The first retainer engages the first side member. The second retainer engages the second side member. The elongated member is connected to the first retainer. The elongated member is bonded to the second retainer. The elongated member projects out from the first retainer, sequentially through the first side member, the annular second engine component and the second side member to the second retainer.

According to still another aspect of the present disclosure, another assembly is provided for a gas turbine engine. This gas turbine engine assembly includes a flowpath wall, a seal element, a fastener and a retainer. The flowpath wall extends circumferentially about an axis. The flowpath wall includes a seal carrier with a first flange and a second flange. The seal element extends circumferentially about the axis. The seal element is axially secured in a groove of the seal carrier between the first flange and the second flange. The fastener rotationally secures the seal element to the flowpath wall. The fastener includes a head and a shank connected to the head. The shank projects out from the head through the first flange, the seal element and the second flange to a distal end of the fastener. The retainer is welded or brazed to the shank at the distal end of the fastener. The first flange, the seal element and the second flange are axially between the head and the retainer.

The assembly may also include a pin. This pin may include a head and a shank integral with the head. The first retainer may be the head. The elongated member may be the shank.

The assembly may also include a second fastener. This second fastener may include a second head and a second elongated member connected to the second head. The seal head may be at the first side of the seal carrier. The second elongated member may project out from the second head through the seal carrier, the seal ring and the plate. The second elongated member may be bonded to the plate.

The fastener may rotationally secure the seal ring to the seal land.

The seal carrier and the seal ring may be clamped between the head and the plate.

The head may be abutted against the seal carrier at the first side of the seal carrier.

The head may be seated in a recess in the seal carrier at the first side of the seal carrier.

The plate may be abutted against the seal carrier at the second side of the seal carrier.

The plate may be welded to the elongated member at a distal end of the elongated member.

The plate may be brazed to the elongated member at a distal end of the elongated member.

The seal carrier may include an annular first side member and an annular second side member. The annular first side member may be disposed at the first side of the seal carrier. The annular second side member may be disposed at the second side of the seal carrier. The annular groove may be formed by and/or may be between the annular first side member and the annular second side member.

The head may engage the annular first side member. The plate may engage the annular second side member.

The annular first side member may have a first member thickness. The annular second side member may have a second member thickness. The plate may have a plate thickness that may be less than the first member thickness and/or the second member thickness.

The annular first side member may have a first member height. The annular second side member may have a second member height. The plate may have a plate height that may be less than the first member height and/or the second member height.

The plate may have an arcuate body.

The seal carrier may be constructed from a seal carrier material. The plate and the fastener may be constructed from a common material that may be different than the seal carrier material.

The seal ring may circumscribe the seal land. The seal carrier may circumscribe the seal ring.

The assembly may also include a flowpath wall and a support structure. The flowpath wall may include the seal carrier. The support structure may include the seal land.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
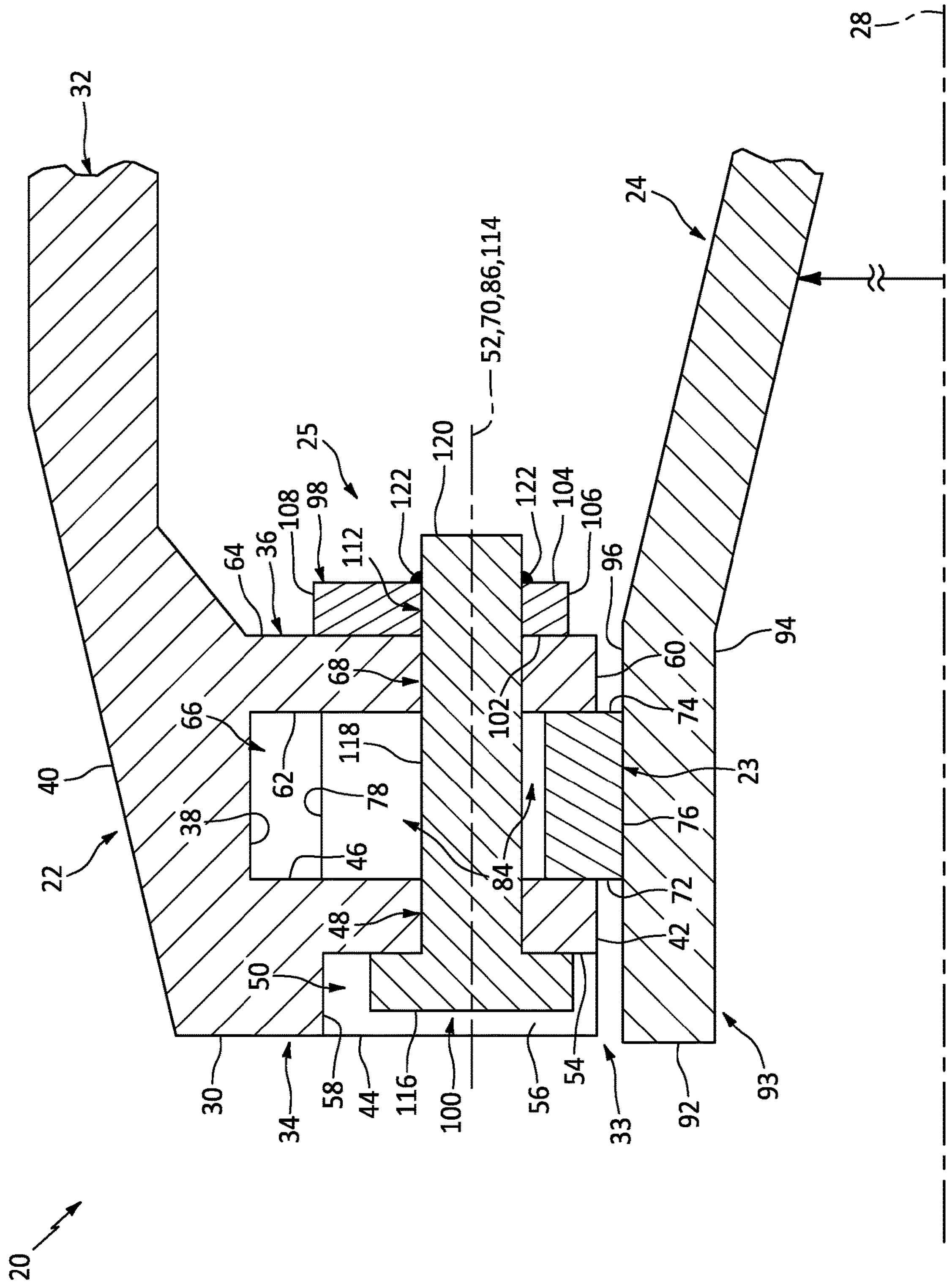
FIG. 1 is a partial side sectional illustration of an assembly for a gas turbine engine.

FIG. 1 illustrates an assembly 20 for a gas turbine engine. This engine assembly 20 includes a plurality of engine components 22-24 and at least one component retention assembly 25.

The first engine component 22 is configured as a stationary component within the gas turbine engine. This first engine component 22 extends axially along a centerline axis 28 to an axial end 30 of the first engine component 22. Briefly, this centerline axis 28 may be a centerline axis of the engine assembly 20 and/or any one or more or all of its engine components 22-25, and may also be coaxial with a rotational axis and/or a centerline axis of the gas turbine engine. The first engine component 22 extends circumferentially about (e.g., completely around) the centerline axis 28 providing the first engine component 22 with, for example, a full-hoop body. The first engine component 22 of FIG. 1 includes a first component base 32 and a seal carrier 33 with a first flange 34 and a second flange 36, where each flange 34, 36 forms a respective side member of the seal carrier 33.

The first component base 32 extends axially along the centerline axis 28 to the first component axial end 30. The first component base 32 extends radially between and to a radial inner side 38 of the first component base 32 and a radial outer side 40 of the first component base 32. The first component base 32 extends circumferentially about (e.g., completely around) the centerline axis 28 providing the first component base 32 with, for example, a tubular geometry.

The first flange 34 (e.g., the seal carrier first side member) of FIG. 1 is located at (e.g., on, adjacent or proximate) the first component axial end 30. The first flange 34 is connected to (e.g., formed integral with or otherwise attached to) the first component base 32. This first flange 34 projects radially out (e.g., in a radial inward direction towards the centerline axis 28) from the first base inner side 38 to a radial inner distal end 42 of the first flange 34. The first flange 34 extends axially along the centerline axis 28 between and to an axial first side 44 of the first flange 34 at the first component axial end 30 and an axial second side 46 of the first flange 34. The first flange 34 extends circumferentially about (e.g., completely around) the centerline axis 28 providing the first flange 34 with, for example, an annular geometry.

Figure 2:
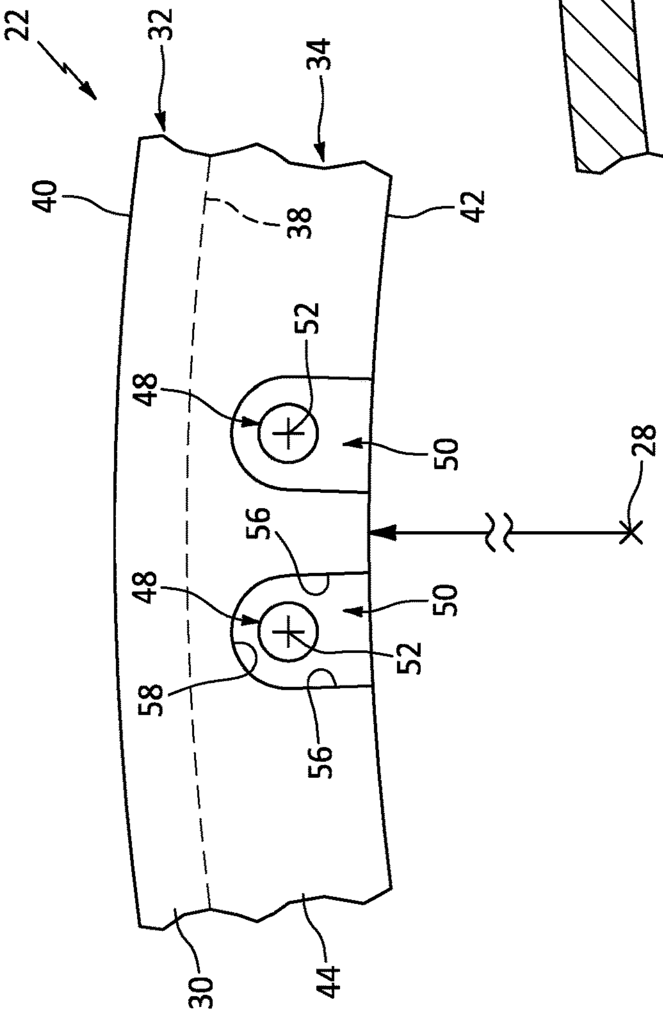
FIG. 2 is a partial end view illustration of a first engine component.

Referring to FIG. 2, the first engine component 22 and its first flange 34 include one or more first flange apertures 48; e.g., first side member apertures. The first engine component 22 and its first flange 34 of FIG. 2 also include one or more first flange recesses 50; e.g., first side member recesses.

Referring to FIG. 1, each of the first flange apertures 48 extends axially through the first flange 34 along a respective aperture centerline 52, which aperture centerline 52 may be parallel with the centerline axis 28. Each first flange aperture 48 of FIG. 1, for example, extends axially through the first flange 34 along its aperture centerline 52 from a respective axial recess end 54 to the first flange second side 46. Each first flange aperture 48 of FIGS. 1 and 2 is configured as a bore; e.g., an axial through-hole. Each first flange aperture 48 of FIG. 2, for example, is circumferentially and radially within (e.g., completely bounded by) the first flange 34. Each first flange aperture 48 of FIG. 2 has a circular cross-sectional geometry when viewed, for example, in a reference plane perpendicular to its aperture axis 52 and/or the centerline axis 28. The present disclosure, however, is not limited to any particular first flange aperture cross-sectional geometries.

Referring to FIG. 1, each of the first flange recesses 50 projects axially into the first flange 34 along the respective aperture centerline 52. Each first flange recess 50 of FIG. 1, for example, projects axially into the first flange 34 along its aperture centerline 52 from the first flange first side 44 to its axial recess end 54. Each first flange recess 50 of FIGS. 1 and 2 is configured as a counter-aperture (e.g., a counter-bore) for a respective one of the first flange apertures 48. Each first flange recess 50 of FIG. 2, for example, extends circumferentially within the first flange 34 between opposing circumferential sides 56 of the respective first flange recess 50. Each first flange recess 50 of FIG. 2 projects radially (e.g., in a radial outward direction away from the centerline axis 28) into the first flange 34 from the first flange distal end 42 to a radial end 58 of the respective first flange recess 50. Each of the recess sides 56 may have a straight cross-sectional geometry when viewed, for example, in the reference plane. The recess end 58 may have an arcuate (e.g., semi-circular) cross-sectional geometry when viewed, for example, in the reference plane. The present disclosure, however, is not limited to any particular first flange recess cross-sectional geometries.

The second flange 36 (e.g., seal carrier second side member) of FIG. 1 is connected to (e.g., formed integral with or otherwise attached to) the first component base 32. This second flange 36 projects radially out (e.g., in the radial inward direction towards the centerline axis 28) from the first base inner side 38 to an inner radial distal end 60 of the second flange 36. The second flange 36 extends axially along the centerline axis 28 between and to an axial first side 62 of the second flange 36 and an axial second side 64 of the second flange 36. The second flange 36 extends circumferentially about (e.g., completely around) the centerline axis 28 providing the second flange 36 with, for example, an annular geometry.

The second flange 36 is axially spaced from the first flange 34 along the centerline axis 28. With this arrangement, the first engine component 22 is configured with a groove 66. The groove 66 of FIG. 1 extends axially along the centerline axis 28 within the first engine component 22 between and to the first flange 34 and the second flange 36. The groove 66 projects radially (e.g., in the radial outward direction away from the centerline axis 28) into the first engine component 22 from the flange distal ends 42 and 60 to the first component base 32 at its first base inner side 38. The groove 66 extends circumferentially about (e.g., completely around) the centerline axis 28 within the first engine component 22 providing the groove 66 with, for example, an annular geometry. This groove 66 is configured as a receptacle for receiving the second engine component 23.

Figure 3:
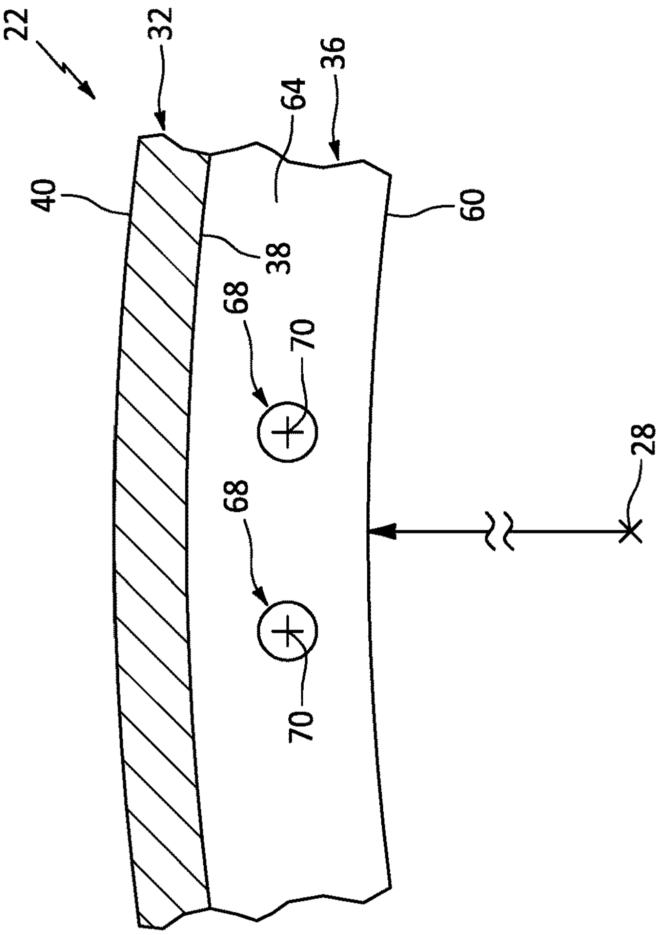
FIG. 3 is a partial cross-sectional illustration of the first engine component.

Referring to FIG. 3, the first engine component 22 and its second flange 36 include one or more second flange apertures 68; e.g., second side member apertures. Referring to FIG. 1, each of these second flange apertures 68 extends axially through the second flange 36 along a respective aperture centerline 70, which aperture centerline 70 may be coaxial with the aperture centerline 52 of a respective one of the first flange apertures 48. Each second flange aperture 68 of FIG. 1, for example, extends axially through the second flange 36 along its aperture centerline 70 from the second flange first side 62 to the second flange second side 64. Each second flange 36 of FIGS. 1 and 3 is configured as a bore; e.g., an axial through-hole. Each second flange aperture 68 of FIG. 3, for example, is circumferentially and radially within (e.g., completely bounded by) the second flange 36. Each second flange aperture 68 of FIG. 3 has a circular cross-sectional geometry when viewed, for example, in the reference plane. The present disclosure, however, is not limited to any particular second flange aperture cross-sectional geometries.

Figure 4:
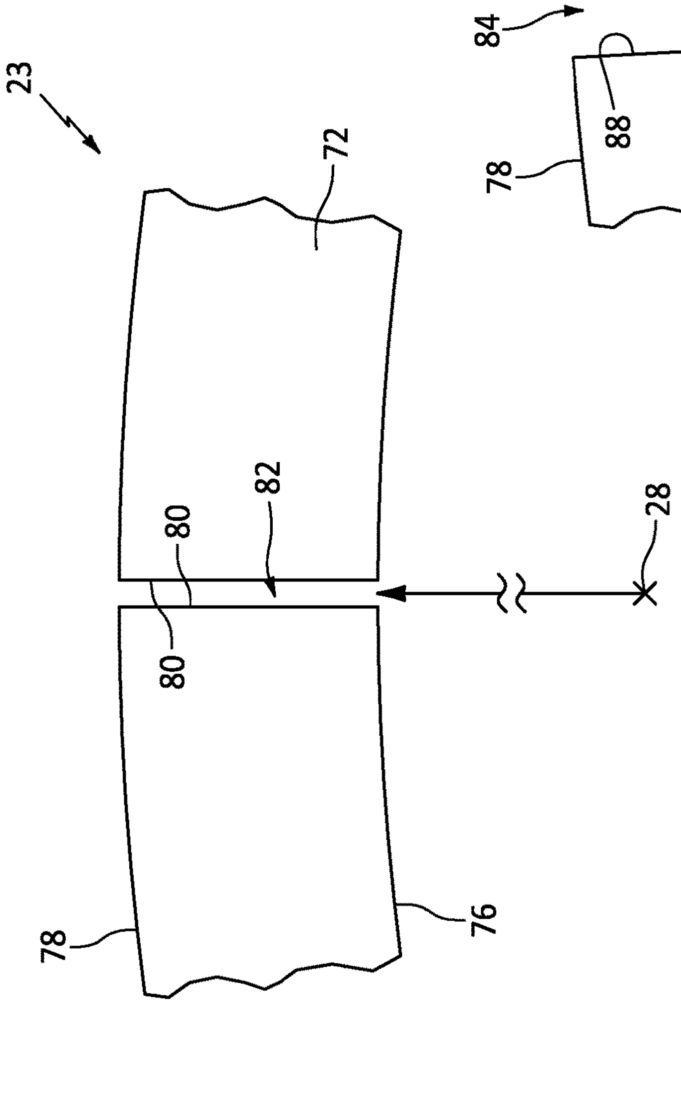
FIG. 4 is a partial end view illustration at a first circumferential location along a second engine component.

The second engine component 23 of FIG. 1 is configured as a seal element; e.g., a seal ring such as a piston ring. The second engine component 23 extends axially along the centerline axis 28 between and to an axial first side 72 of the second engine component 23 and an axial second side 74 of the second engine component 23. The second engine component 23 extends radially between and to a radial inner side 76 of the second engine component 23 and a radial outer side 78 of the second engine component 23. The second engine component 23 extends circumferentially about (e.g., completely around) the centerline axis 28 providing the second engine component 23 with, for example, a substantially full-hoop body. The second engine component 23 of FIG. 4, for example, extends circumferentially about the centerline axis 28 between and to opposing circumferential ends 80, where the circumferential ends 80 form a (e.g., relatively thin) slot 82 in the second engine component 23. This slot 82 extends axially and radially through the second engine component 23 providing the second engine component 23 with a split ring configuration. Of course, in other embodiments, the second engine component 23 may have a complete full-hoop body.

Figure 5:
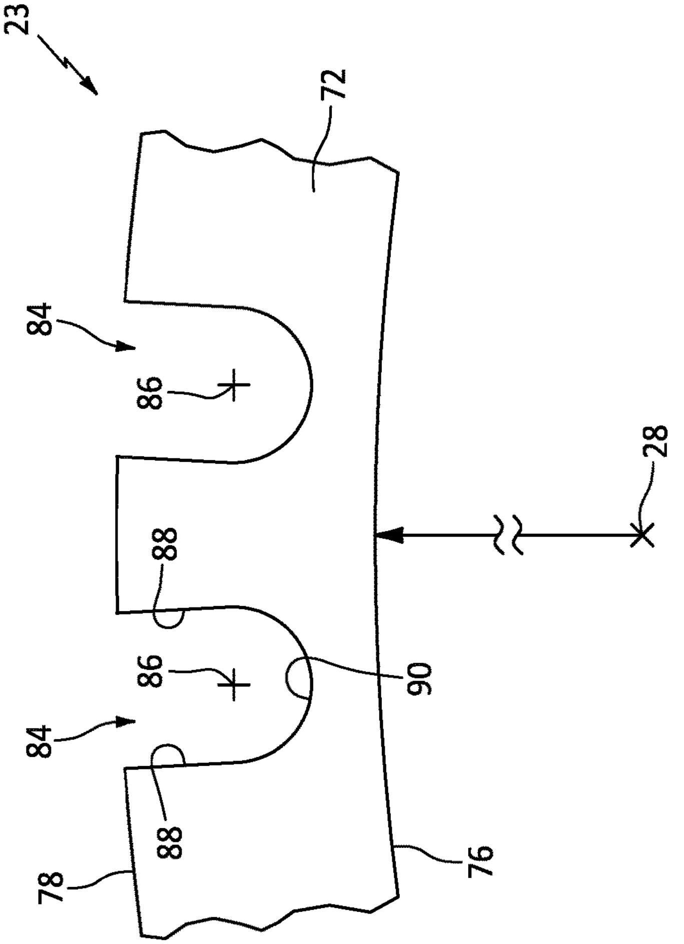
FIG. 5 is a partial end view illustration at a second circumferential location along the second engine component.

Referring to FIG. 5, the second engine component 23 includes one or more second component apertures 84. Referring to FIG. 1, each of these second component apertures 84 extends axially through the second engine component 23 along a respective aperture centerline 86, which aperture centerline 86 may be parallel with the centerline axis 28 and/or coaxial with the aperture centerline 52, 70 of a respective flange aperture 48, 68. Each second component aperture 84 of FIG. 1, for example, extends axially through the second engine component 23 along its aperture centerline 86 from the second component first side 72 to the second component second side 74. Each second component aperture 84 of FIGS. 1 and 5 is configured as a slot; e.g., an axial through-slot. Each second component aperture 84 of FIG. 5, for example, extends circumferentially within the second engine component 23 between opposing circumferential sides 88 of the respective second component aperture 84. Each second component aperture 84 of FIG. 5 projects radially (e.g., in the radial inward direction towards the centerline axis 28) into the second engine component 23 from the second component outer side 78 to a radial end 90 of the respective second component aperture 84. Each of the aperture sides 88 may have a straight cross-sectional geometry when viewed, for example, in the reference plane. The aperture end 90 may have an arcuate (e.g., semi-circular) cross-sectional geometry when viewed, for example, in the reference plane. The present disclosure, however, is not limited to any particular second component aperture cross-sectional geometries.

The third engine component 24 of FIG. 1 is configured as another stationary component within the gas turbine engine. This third engine component 24 extends axially along the centerline axis 28 between and to an axial end 92 of the third engine component 24, which third component axial end 92 may be substantially axially aligned with the first component axial end 30 along the centerline axis 28. The third engine component 24 includes a seal land 93 at the third component axial end 92. This seal land 93 extends radially between and to a radial inner side 94 of the third engine component 24 and a radial outer side 96 of the third engine component 24. The third engine component 24 and its seal land 93 extend circumferentially about (e.g., completely around) the centerline axis 28 providing the third engine component 24 and its seal land 93 with, for example, a full-hoop body.

The second engine component 23 of FIG. 1 is configured to seal an annular gap between the first engine component 22 and the second engine component 23. The second engine component 23 of FIG. 1, for example, is received within the groove 66. More particularly, the second engine component 23 projects radially (e.g., in the radial outward direction away from the centerline axis 28) into the groove 66. The second engine component 23 is thereby captured/secured axially between the first flange 34 and the second flange 36; e.g., between the seal carrier side members. With this arrangement, during operation of the gas turbine engine, a pressure differential across the second engine component 23 may push the second engine component 23 against one of the flanges 34, 36 and its respective axial side 46, 62. The second engine component 23 may thereby axially sealingly engage (e.g., abut against, contact, etc.) a respective one of the flanges 34, 36. In addition, a radial inner portion of the second engine component 23 disposed outside of the groove 66 may radially sealingly engage (e.g., abut against, contact, etc.) a (e.g., cylindrical) seal land surface of the third engine component 24 and its seal land 93 at the third component outer side 96. The third engine component 24 may thereby also radially capture/secure the second engine component 23 within the groove 66.

Figure 6:
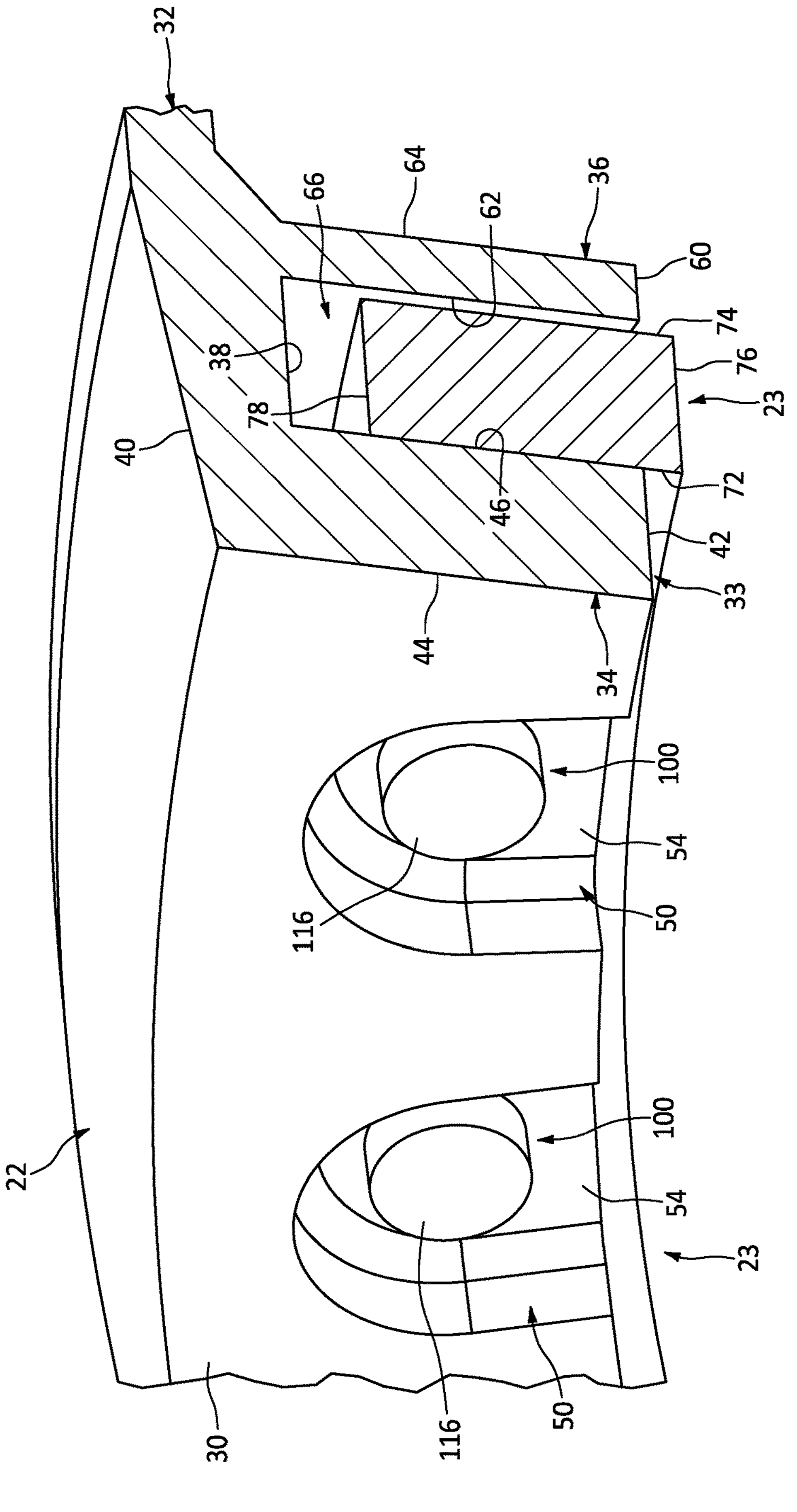
FIG. 6 is a partial perspective cutaway illustration of the engine assembly.

The component retention assembly 25 is configured to prevent (or limit) rotation of the second engine component 23 within the groove 66, which rotation may lead to premature wear of one or more of the engine components 22-24. The component retention assembly 25 of FIG. 1, in particular, rotationally secures (e.g., fixes) the second engine component 23 to the first engine component 22 and its flanges 34 and 36. The component retention assembly 25 of FIGS. 1, 6 and 7, for example, includes an (e.g., sacrificial) assembly retainer 98 and one or more fasteners 100; e.g., retainer pins or other devices with elongated members.

Figure 7:
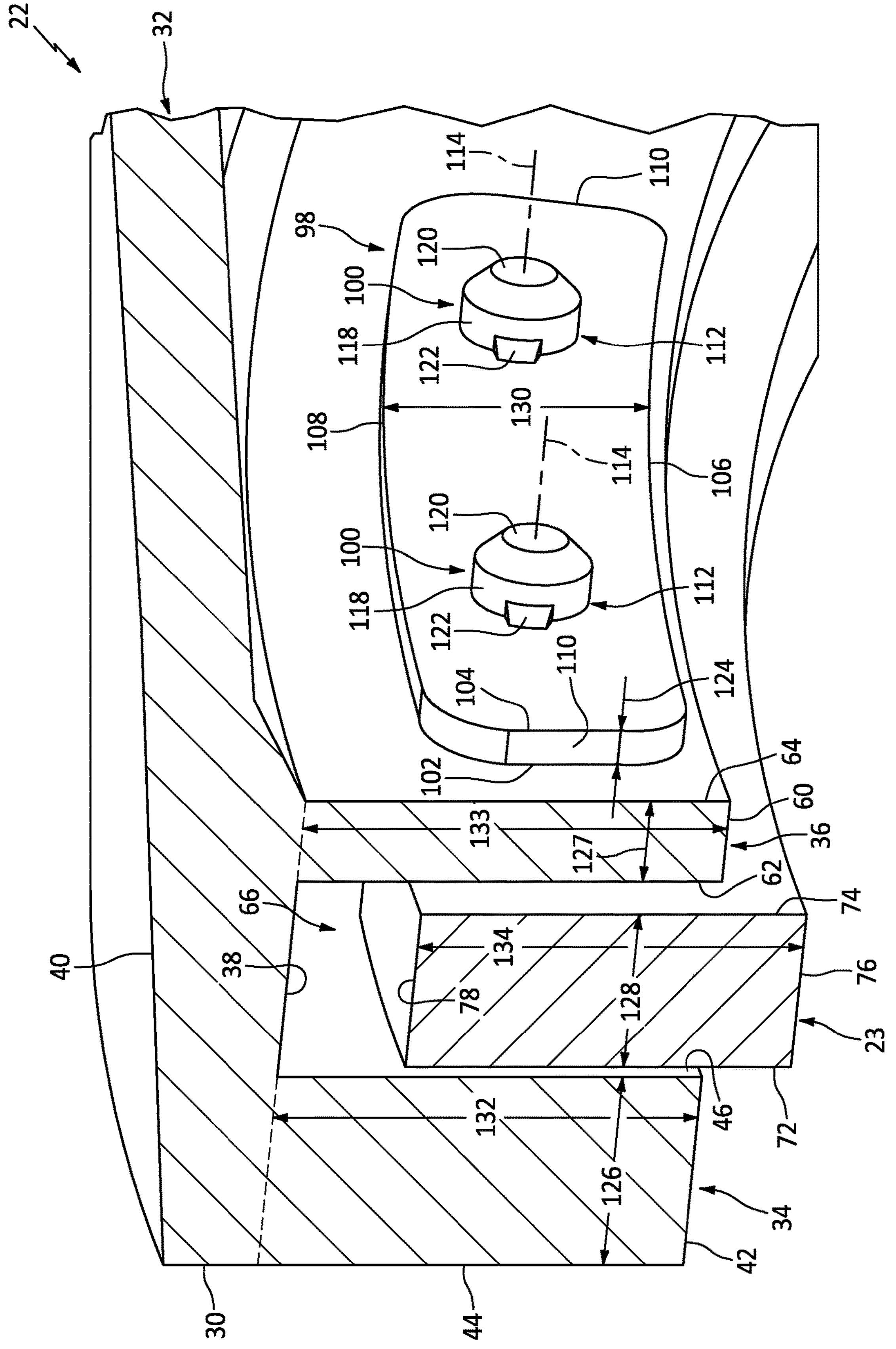
FIG. 7 is another partial perspective cutaway illustration of the engine assembly.

The assembly retainer 98 of FIGS. 1 and 7 is configured as a backing plate/retention plate for the fasteners 100. The assembly retainer 98 of FIGS. 1 and 7 extends axially along the centerline axis 28 between and to an axial first side 102 of the assembly retainer 98 and an axial second side 104 of the assembly retainer 98. The assembly retainer 98 extends radially between and to a radial inner side 106 of the assembly retainer 98 and a radial outer side 108 of the assembly retainer 98. The assembly retainer 98 of FIG. 7 extends circumferentially between and to opposing circumferential ends 110 of the assembly retainer 98.

The assembly retainer 98 of includes one or more retainer apertures 112. Referring to FIG. 1, each of these retainer apertures 112 extends axially through the assembly retainer 98 along a respective aperture centerline 114, which aperture centerline 114 may be parallel with the centerline axis 28 and/or coaxial with the aperture centerline 52, 70, 86 of a respective aperture 48, 68, 84. Each retainer aperture 112 of FIG. 1, for example, extends axially through the assembly retainer 98 along its aperture centerline 114 from the retainer first side 102 to the retainer second side 104. Each retainer aperture 112 of FIGS. 1 and 7 is configured as a bore; e.g., an axial through-hole. Each retainer aperture 112 of FIG. 7, for example, is circumferentially and radially within (e.g., completely bounded by) the assembly retainer 98. Each retainer aperture 112 of FIG. 7 has a circular cross-sectional geometry when viewed, for example, in the reference plane. The present disclosure, however, is not limited to any particular retainer aperture cross-sectional geometries.

Referring to FIGS. 1 and 7, the assembly retainer 98 is arranged with the first engine component 22. The retainer first side 102 of FIGS. 1 and 7, for example, axially engages (e.g., abuts against, contacts, etc.) the second flange second side 64. Each of the fasteners 100 is then respectively mated with a respective set of the apertures 48, 84, 68 and 112. More particularly, each fastener 100 of FIG. 1 includes a retainer 116 and an elongated member 118, where the retainer 116 of FIG. 1 is a head of the respective fastener 100 and the elongated member of FIG. 1 is an unthreaded shank of the respective fastener 100. The retainer 116 is disposed in a respective one of the first flange recesses 50. The retainer 116 axially engages (e.g., abuts against, contacts, etc.) the first flange 34 and its recess end 54. The elongated member 118 is connected to (e.g., formed integral with or otherwise connected to) the retainer 116. The elongated member 118 projects axially along the aperture centerline 52, 86, 70, 114/the centerline axis 28 out from the retainer 116, sequentially through the respective apertures 48, 84, 68 and 112, to an axial distal end 120 of the respective fastener 100 and its elongated member 118. At this fastener distal end 120, the respective fastener 100 and its elongated member 118 are bonded (e.g., welded, brazed, etc.) to the assembly retainer 98 with bonding material 122; e.g., weld, braze, etc. Each of the fasteners 100 is thereby fixed to the assembly retainer 98, and the various engine assembly elements 34, 23 and 36 are captured axially between the retainers 116 on a first side of the seal carrier 33 and the assembly retainer 98 on a second side of the seal carrier 33.

In some embodiments, referring to FIG. 7, each of the elongated members 118 may have a circular cross-sectional geometry when viewed, for example, in a plane perpendicular to the respective aperture centerline 114. However, in other embodiments, one or more of the elongated members 118 may alternatively have a non-circular cross-sectional geometry such as, but not limited to, an oval cross-sectional geometry or a polygonal cross-sectional geometry.

The assembly retainer 98 may be configured as a dedicated component for axially retaining the fasteners 100 within the apertures 48, 84 and 68. The assembly retainer 98, for example, may not be used for transferring loads during gas turbine engine operation and/or structurally supporting any other components of the gas turbine engine. The assembly retainer 98 of FIGS. 1 and 7, for example, may only be connected to, contact and/or otherwise engage the fasteners 100 and the second flange 36. The assembly retainer 98 may thereby have a smaller form than the other elements 23, 34 and 36 of the engine assembly 20. The assembly retainer 98 of FIG. 7, for example, may have a smaller axial thickness 124 than an axial thickness 126-128 of any one or more or all of the elements 34, 36 and 23. The assembly retainer 98 may also or alternatively have a smaller radial height 130 than a radial height 132-134 of any one or more or all of the elements 34, 36 and 23. The assembly retainer 98 may also or alternatively extend circumferentially about the centerline axis 28 a fewer number of degrees than any one or more or all of the elements 34, 36 and 23. The assembly retainer 98 of FIG. 7, for example, may extend between two degrees (2°) and fifteen degrees (15°) about the centerline axis 28 between its circumferential ends 110, whereas the engine assembly elements 34, 36 and 23 may extend between three-hundred and fifty degrees (350°) and three-hundred and sixty degrees (360°) about the centerline axis 28. Thus, whereas the engine assembly elements 34, 36 and 23 may be annular, the assembly retainer 98 is an arcuate body or any other non-annular body.

The assembly retainer 98 is constructed from retainer material; e.g., metal. Each of the fasteners 100 is constructed from fastener material; e.g., metal. The fastener material and the retainer material may be a common (e.g., the same) material or different materials with similar properties to facilitate bonding of the fasteners 100 to the assembly retainer 98. By contrast, the engine components 22-24 may be constructed from a common engine component material or different engine component materials, which engine component material(s) is/are different than the retainer material and the fastener material. Different properties of the engine component material(s) and the fastener material may make it difficult to weld or otherwise bond the fasteners 100 to the first engine component 22. The assembly retainer 98 is thereby located adjacent the first engine component 22 to provide the first flange 34 with a like material to the fastener material (e.g., a bond layer) to which the fasteners 100 may be welded or otherwise bonded.

Figure 8:
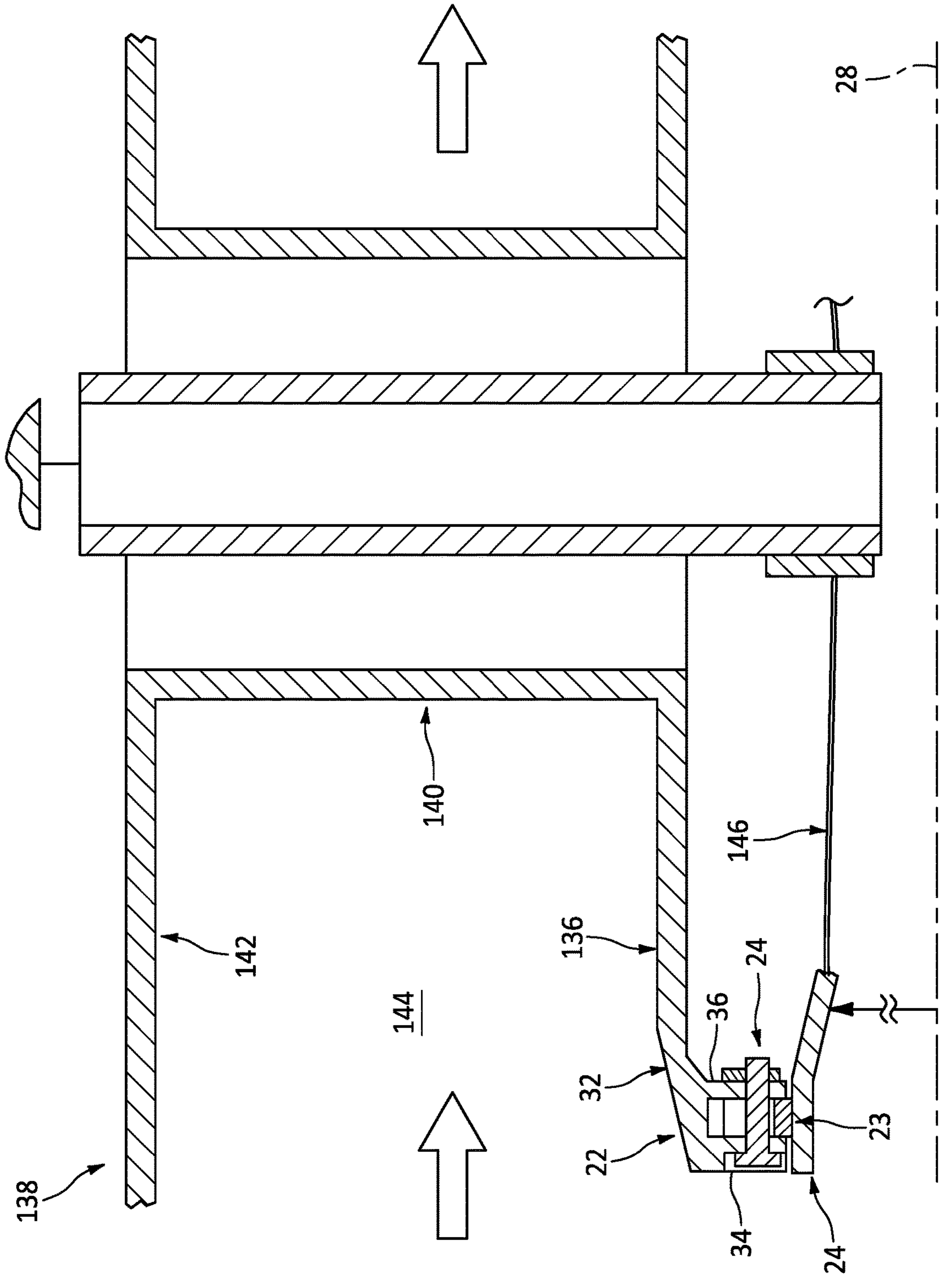
FIG. 8 is a partial side sectional illustration of the gas turbine engine at a vane array.

In some embodiments, referring to FIG. 8, the first engine component 22 may be configured as or otherwise include a flowpath wall 136. The first engine component 22 of FIG. 8, for example, may be configured as or otherwise include a stator vane array 138; e.g., a combustor nozzle or a turbine nozzle. This stator vane array 138 includes a plurality of vanes 140 (one visible in FIG. 8) extending radially between and connected to the (e.g., inner) flowpath wall 136 and another (e.g., outer) flowpath wall 142. With such an embodiment, the first component base 32 may form the flowpath wall 136 where the flanges 34 and 36 are disposed radially opposite a flowpath 144 through the stator vane array 138. In such embodiments, the third engine component 24 may be configured as an internal support structure 146 for the gas turbine engine such as, but not limited to, a bearing support structure and/or a frame.

Figure 9:
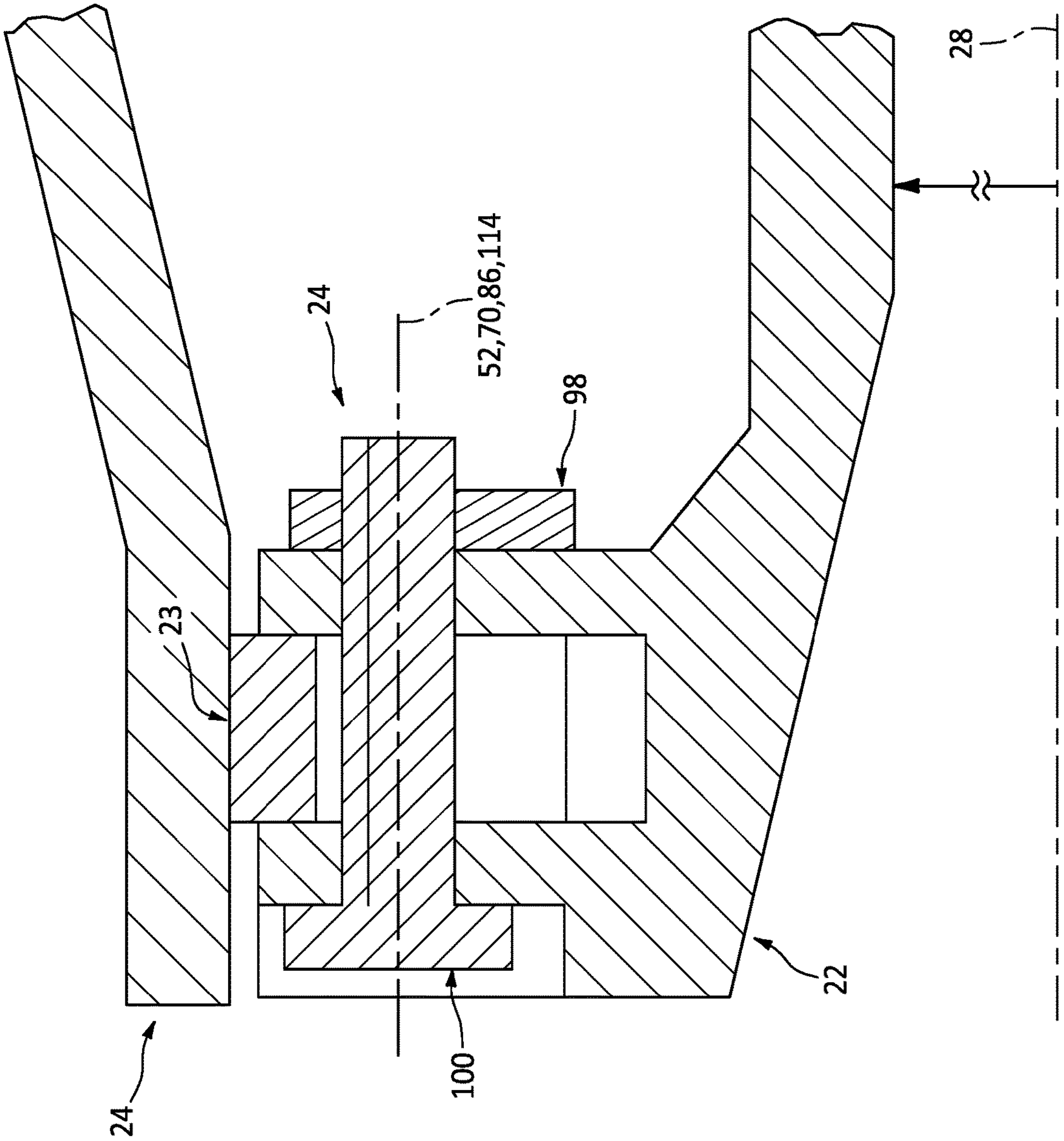
FIG. 9 is a partial side sectional illustration of another assembly for the gas turbine engine.

In some embodiments, referring to FIGS. 1 and 8, the second engine component 23 may be disposed radially inboard of the first engine component 22 and radially outboard of the third engine component 24. The present disclosure, however, is not limited to such an exemplary spatial relationship. The second engine component 23 of FIG. 9, for example, is disposed radially outboard of the first engine component 22 and radially inboard of the third engine component 24.

Figure 10:
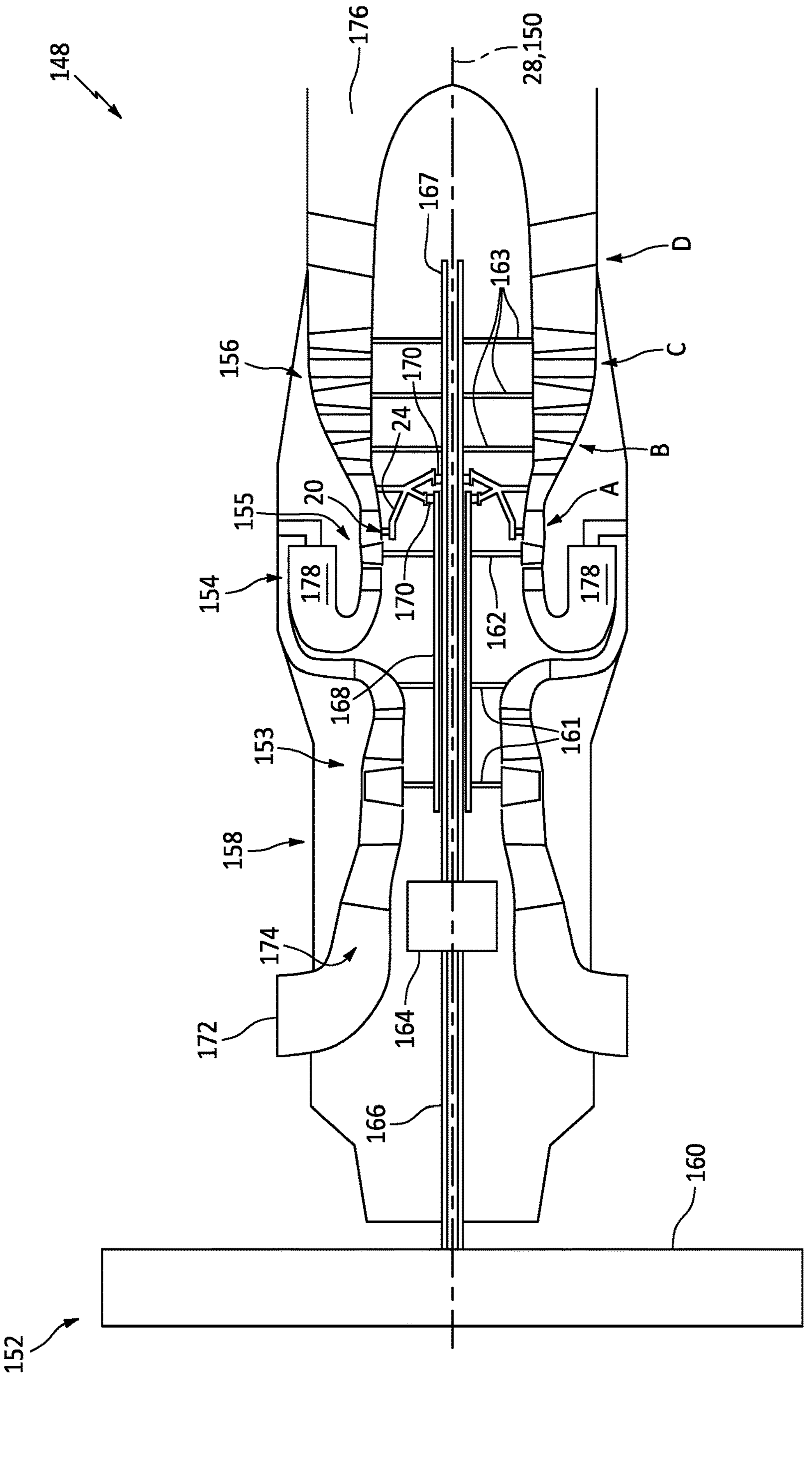
FIG. 10 is a side schematic illustration of a turbojet gas turbine engine with which the engine assembly may be included.

FIG. 10 illustrates an example of the gas turbine engine with which the engine assembly 20 described above may be configured. This gas turbine engine is configured as a turboprop gas turbine engine 148. This gas turbine engine 148 of FIG. 10 extends axially along a rotational axis 150 of the gas turbine engine between a forward end of the gas turbine engine 148 and an aft end of the gas turbine engine 148, which rotational axis 150 may be the same or different than the centerline axis 28 of FIG. 1. The gas turbine engine 148 includes a propulsor (e.g., propeller) section 152, a compressor section 153, a combustor section 154 and a turbine section. The turbine section of FIG. 10 includes a high pressure turbine (HPT) section 155 and a low pressure turbine (LPT) section 156, which LPT section 156 may also be referred to as a power turbine.

The engine sections 153-156 are arranged within a stationary structure 158; e.g., an engine housing. This stationary structure 158 includes the engine components 22-25 of FIG. 1.

Each of the engine sections 152, 153, 155 and 156 includes a respective bladed rotor 160-163. Each of these bladed rotors 160-163 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The propulsor rotor 160 is connected to a geartrain 164, for example, through a propulsor shaft 166. The geartrain 164 is connected to and driven by the LPT rotor 163 through a low speed shaft 167, where the LPT rotor 163 and the low speed shaft 167 of FIG. 10 form a low speed rotating structure. The compressor rotor 161 is connected to and driven by the HPT rotor 162 through a high speed shaft 168, where the compressor rotor 161, the HPT rotor 162 and the high speed shaft 168 of FIG. 10 form a high speed rotating structure. The rotating structure shafts 166-168 are rotatably supported by a plurality of bearings (e.g., 170). Each of these bearings 170 is connected to the stationary structure 158 by at least one internal support structure which may include the third engine component 24.

During operation, air enters the gas turbine engine 148 through an airflow inlet 172. This air is directed into a core flowpath 174 (e.g., 144 of FIG. 8) that extends sequentially through the engine sections 153-156 (e.g., an engine core) to a combustion products exhaust 176. The air within the core flowpath 174 may be referred to as "core air".

The core air is compressed by the compressor rotor 161 and directed into a combustion chamber 178 of a combustor in the combustor section 154. Fuel is injected into the combustion chamber 178 and mixed with the compressed core air to provide a fuel-air mixture. This fuel air mixture is ignited and combustion products thereof flow through and sequentially cause the HPT rotor 162 and the LPT rotor 163 to rotate. The rotation of the HPT rotor 162 drives rotation of the compressor rotor 161 and, thus, compression of the air received from the airflow inlet 172. The rotation of the LPT rotor 163 drives rotation of the propulsor rotor 160, which propels air aft along and outside of the gas turbine engine 148 and its stationary structure 158.

A joint between the components 22-24 (see FIG. 1) of the engine assembly 20 of FIG. 10 is located at a mid-turbine frame location A between the HPT rotor 162 and the LPT rotor 163. Such a joint, however, may also or alternatively be located at other various locations within the gas turbine engine 148 and its engine core. Examples of such alternative locations include, but are not limited to, locations B-D. Furthermore, while the joints are described above as being in or about a hot section (e.g., the turbine section) of the gas turbine engine 148, it is contemplated the joint may also or alternatively be located in other sections of the gas turbine engine 148.

The engine assembly 20 may be included in various gas turbine engines other than the one described above. The engine assembly 20, for example, may be included in a geared gas turbine engine where a geartrain connects one or more shafts to one or more rotors in a fan section, a compressor section and/or any other engine section; e.g., a geared engine. The engine assembly 20 may alternatively be included in a gas turbine engine configured without a geartrain; e.g., a direct drive engine. The engine assembly 20 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a seal carrier with an annular groove, the seal carrier extending between a first side and a second side;
a seal land opposite the annular groove;
a seal ring sealing a gap between the seal carrier and the seal land, the seal ring seated in the annular groove;
a plate at the second side of the seal carrier; and
a fastener including a head and an elongated member connected to the head;
the head at the first side of the seal carrier;
the elongated member projecting out from the head through the seal carrier, the seal ring and the plate, and the elongated member bonded to the plate;
the seal carrier constructed from a seal carrier material; and
the plate and the fastener constructed from a common material that is different than the seal carrier material.

2. The assembly of claim 1, further comprising:
a second fastener including a second head and a second elongated member connected to the second head;
the second head at the first side of the seal carrier;
the second elongated member projecting out from the second head through the seal carrier, the seal ring and the plate; and
the second elongated member bonded to the plate.

3. The assembly of claim 1, wherein the fastener rotationally secures the seal ring to the seal land.

4. The assembly of claim 1, wherein the seal carrier and the seal ring are clamped between the head and the plate.

5. The assembly of claim 1, wherein the head is abutted against the seal carrier at the first side of the seal carrier.

6. The assembly of claim 1, wherein the head is seated in a recess in the seal carrier at the first side of the seal carrier.

7. The assembly of claim 1, wherein the plate is abutted against the seal carrier at the second side of the seal carrier.

8. The assembly of claim 1, wherein the plate is welded to the elongated member at a distal end of the elongated member.

9. The assembly of claim 1, wherein the plate is brazed to the elongated member at a distal end of the elongated member.

10. The assembly of claim 1, wherein the seal carrier includes an annular first side member and an annular second side member;

the annular first side member is disposed at the first side of the seal carrier;

the annular second side member is disposed at the second side of the seal carrier; and the annular groove is formed by and between the annular first side member and the annular second side member.

11. The assembly of claim 10, wherein the head engages the annular first side member; and the plate engages the annular second side member.

12. The assembly of claim 10, wherein the annular first side member has a first member thickness;

the annular second side member has a second member thickness; and the plate has a plate thickness that is less than at least one of the first member thickness or the second member thickness.

13. The assembly of claim 1, wherein the plate is an arcuate body.

14. The assembly of claim 1, wherein the seal ring circumscribes the seal land; and the seal carrier circumscribes the seal ring.

15. The assembly of claim 1, further comprising:

a flowpath wall that includes the seal carrier; and a support structure that includes the seal land.

16. An assembly for a gas turbine engine, comprising:

a seal carrier with an annular groove, the seal carrier extending between a first side and a second side;

a seal land opposite the annular groove;

a seal ring sealing a gap between the seal carrier and the seal land, the seal ring seated in the annular groove;

a plate at the second side of the seal carrier; and a fastener including a head and an elongated member connected to the head;

the head at the first side of the seal carrier;

the elongated member projecting out from the head through the seal carrier, the seal ring and the plate, and the elongated member bonded to the plate;

the seal carrier including an annular first side member and an annular second side member, the annular first side member disposed at the first side of the seal carrier, the annular second side member disposed at the second side of the seal carrier, and the annular groove formed by and between the annular first side member and the annular second side member; and the annular first side member having a first member height, the annular second side member having a second member height, and the plate having a plate height that is less than at least one of the first member height or the second member height.

* * * * *